United States Patent [19]

Arndt

[11] Patent Number: 4,509,775

[45] Date of Patent: Apr. 9, 1985

[54] SPRING AND RETAINER ASSEMBLY AND SPRING DELASHED STEERING SHAFTS

[75] Inventor: Frederick P. Arndt, Saginaw, Mich.

[73] Assignee: General Motors Corporation, Detroit, Mich.

[21] Appl. No.: 506,487

[22] Filed: Jun. 21, 1983

[51] Int. Cl.³ .............................................. B62D 1/16
[52] U.S. Cl. ..................................... 280/779; 29/227; 74/492; 267/170
[58] Field of Search ........................ 280/774, 777, 779; 74/492, 493; 267/60, 166, 170; 29/172, 215, 225, 227

[56] References Cited

U.S. PATENT DOCUMENTS

| 2,334,884 | 11/1943 | Peterson | 29/227 |
| 2,882,086 | 4/1959 | Steinback | 294/78 A |
| 2,883,925 | 4/1959 | Pritchard et al. | 100/1 |
| 2,961,891 | 11/1960 | Sewelin | 280/779 |
| 3,499,341 | 3/1970 | Landay | 267/170 |
| 3,916,720 | 11/1975 | Smith | 74/492 |
| 3,949,623 | 4/1976 | Fujiwara et al. | 74/492 |
| 4,088,377 | 5/1978 | Corrigan | 29/227 |

Primary Examiner—Joseph F. Peters, Jr.
Assistant Examiner—Kenneth R. Rice
Attorney, Agent, or Firm—Charles R. White

[57] ABSTRACT

Structure and method of encapsulating a compression spring to a height less than working height in between end seats which can be selectively released when in an installed position to permit the spring to extend to a working height.

6 Claims, 7 Drawing Figures

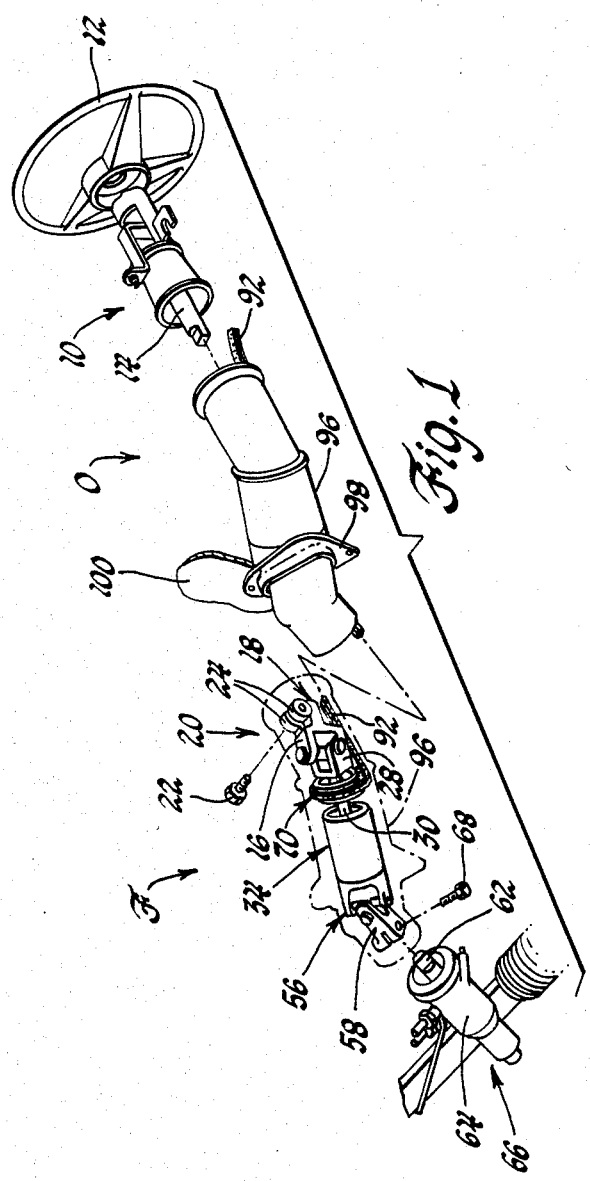
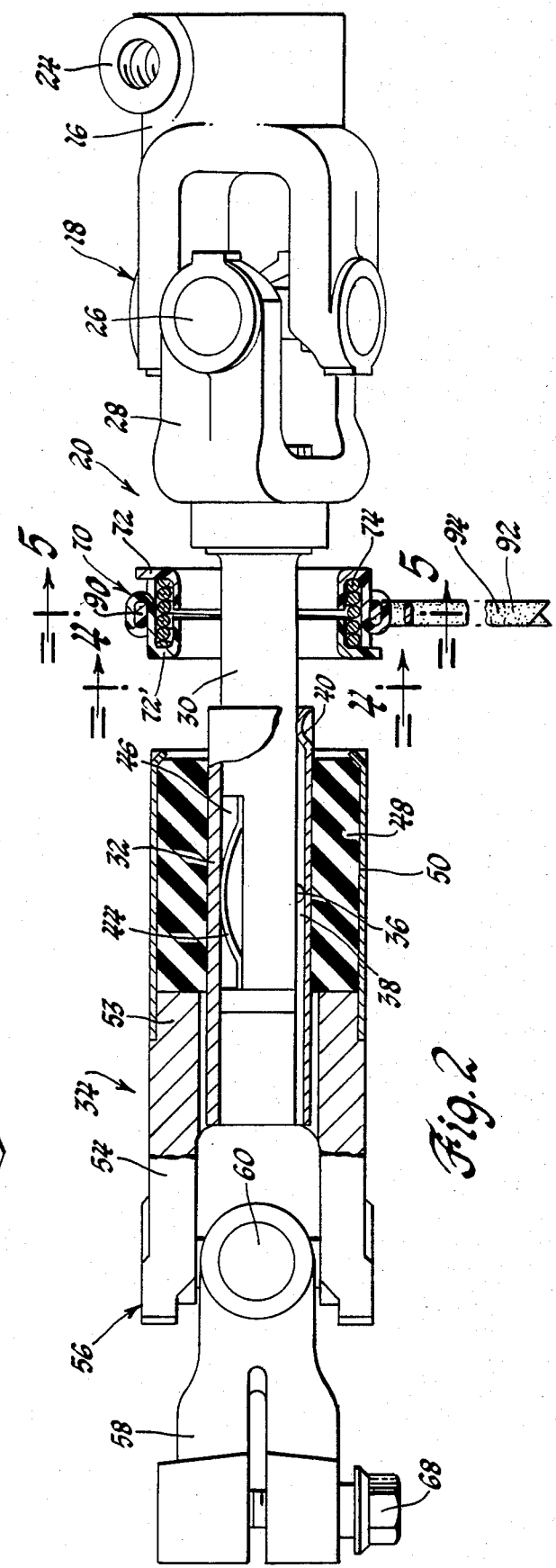

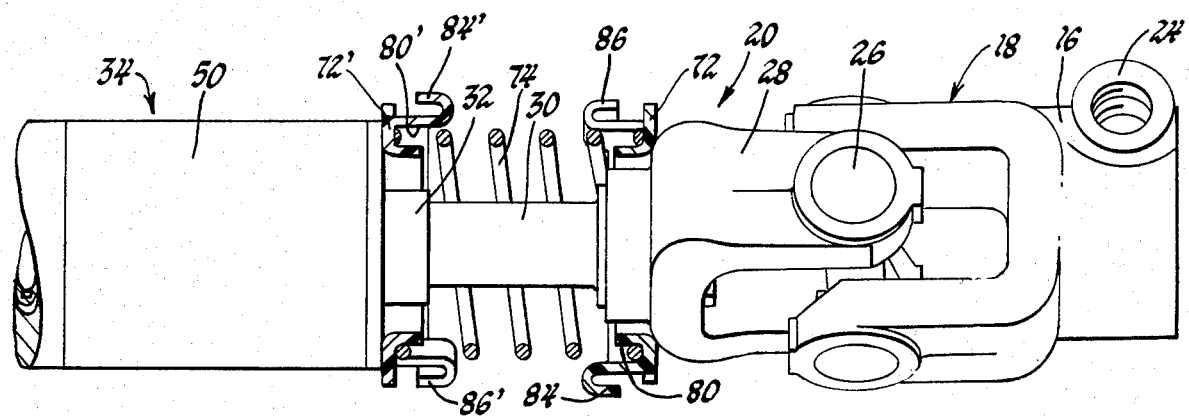
Fig. 3
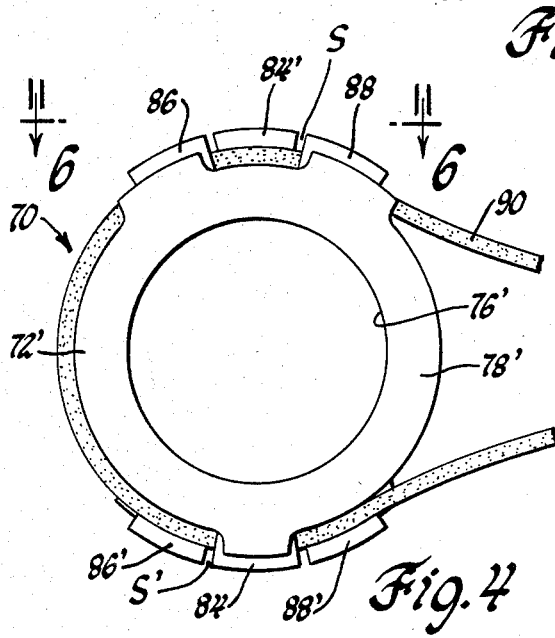
Fig. 4
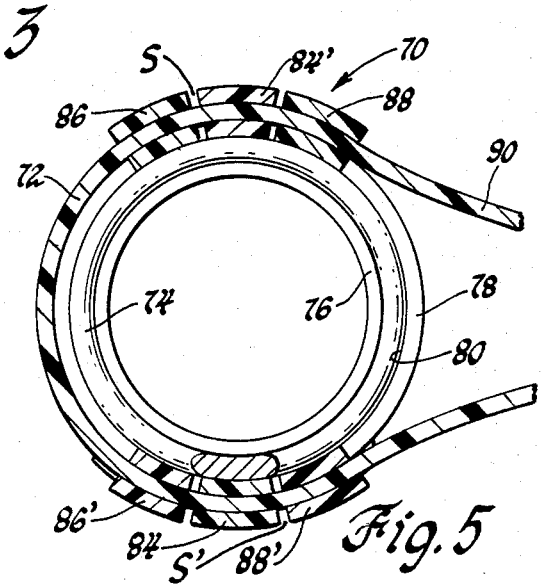
Fig. 5
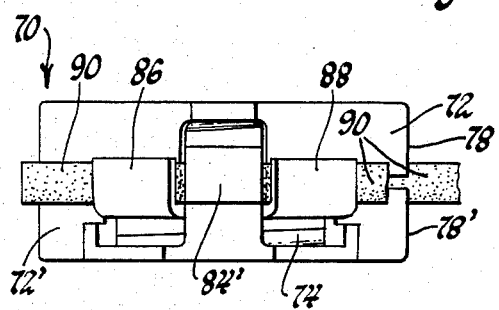
Fig. 6
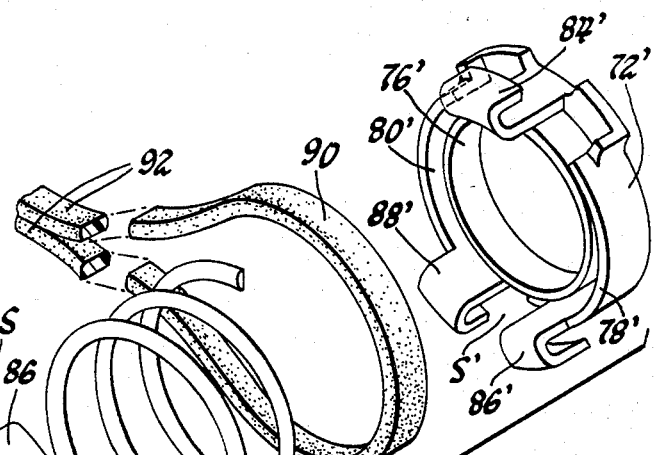
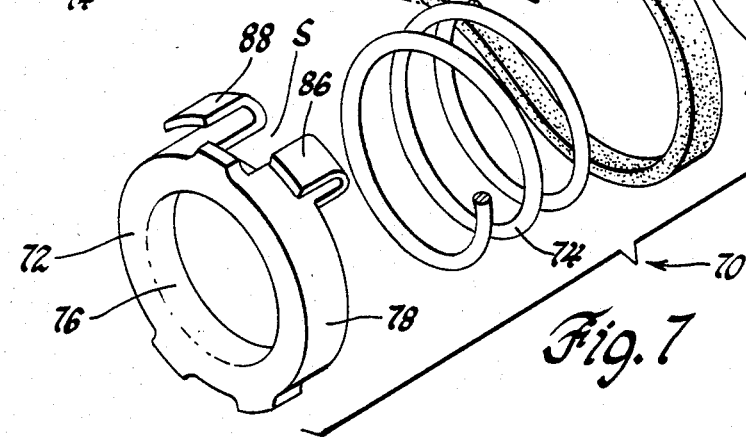
Fig. 7

SPRING AND RETAINER ASSEMBLY AND SPRING DELASHED STEERING SHAFTS

The invention relates to a spring and retainer assembly in which a compression spring, entrapped between spring seats at a distance less than spring working height, is selectively releasable to preload axially slidable components such as a vehicle steering shaft assembly. This invention also relates to a new and improved method of installing steering shafting in a vehicle.

In many constructions, spring devices are required in remote or inexcessible locations where installation is often tedious and time consuming. For example, helical anti-rattle or delashing springs may be needed between rotatable drive and driven components of an assembly having splines or flats allowing axial slip fit for installation purposes. Installation difficulties may be encountered when collapsing such telescopic components since the spring force must be overcome before the components are employed in an installation. The present invention solves many installation difficulties encountered with anti-rattle springs and facilitates the installation of telescopic shafting or other components using such anti-rattle springs.

In the preferred embodiment of this invention, a helical spring compressed to a predetermined height between end coil seats or retainers and held in this position around the slip fit or telescopic connection of the intermediate shaft of a steering column. This allows the intermediate shaft to be readily telescoped to a shortened length without overcoming the force of the spring to facilitate the connection of the intermediate shaft to the steering gear fixed in the vehicle. The retainers are released when desired so that the spring expands to a working height axially preloading the slip fit connection to reduce axial lash between these components and to eliminate rattle. Since the spring assemblies are encapsulated, spring tangling problems are minimized. Also, this invention provides an improved method of installation of steering shafts in vehicles or other telescopic components since the encapsulated spring can be remotely located with respect to the installer and then after components have been coupled together, the spring can be easily released to a working height to axially load the components and reduce lash therebetween. With this invention, there is improved seating for the springs since the encapsulating device provides seats for the ends of the spring which isolate the spring from the components connected together.

It is a feature, object and advantage of this invention to provide a new and improved spring and retainer assembly in which a helical spring is entrapped in a compact package comprising end seats connected by a release strap eliminating spring tangling and facilitating installation of the spring in an inaccessible location and facilitating installation of units utilizing the spring.

It is another feature, object and advantage of this invention to provide a new and improved spring and retainer assembly in which the spring is precompressed to a height less than working height to facilitate the assembly of telescopic components subsequently preloaded by the spring such as steering shafts to a steering gear in a vehicle.

Another feature, object and advantage of this invention is to provide a new and improved spring assembly which has spring seats for the ends of the spring which are used to isolate the spring from the other component of the assembly and which spring seats are used to hold the spring in compression prior to the assembly and which allows the release of a compressed spring in an isolated position to a working height so that components of the assembly are preloaded.

Another feature, object and advantage of this invention is to provide a new and improved method of installing a steering column in a vehicle.

These and other features, objects and advantages of the invention will become more apparent from the following detailed description and drawings in which:

FIG. 1 is an exploded isometric view of a portion of a steering column assembly, an intermediate shaft assembly and a portion of a rack and pinion steering gear.

FIG. 2 is an enlarged view partially in cross-section of the intermediate shaft assembly of FIG. 1.

FIG. 3 is a side elevational view of a portion of the intermediate shaft assembly of FIG. 2 showing the spring and retainer assembly of this invention in the installed position.

FIG. 4 is an end view taken along lines 4—4 of FIG. 2.

FIG. 5 is a sectional view taken generally along lines 5—5 of FIG. 2.

FIG. 6 is a side elevational view of the spring retainer assembly of FIGS. 2-5.

FIG. 7 is an exploded isometric view showing the components of the spring retainer assembly of this invention.

Turning now in greater detail to the drawing, there is shown in FIG. 1 a steering column assembly 10 on which hand wheel 12 is mounted for turning the upper steering shaft 14 which extends axially through the center of the steering column assembly. The lower end of steering shaft 14 has flattened sides to key into a split clamping yoke 16 of a universal joint 18 that forms the upper end of an intermediate steering shaft assembly 20. As will be pointed out later, the shaft assembly 20 can be telescoped between collapsed and extended positions for length adjustment for mounting the steering column assembly within a vehicle. The upper steering shaft 14 is secured to the universal joint 18 by turning pinch bolt 22 to close the upstanding ears 24 that constricts the clamping yoke 16 to thereby grip the end of steering shaft 14. The clamping yoke is connected by a conventional universal joint spider 26 to a second yoke 28 which has an elongated drive shaft 30 extending therefrom. This drive shaft 30 telescopes and slidably fits in a tubular connector shaft 32 of a torsional damper assembly 34. Drive shaft 30 has flattened sides which fit corresponding sides of the tubular connector shaft 32 so that driver steering force is transmitted with minimal lash to the vehicle steering gear described below. A key 36, radially projecting from the drive shaft 30, slides in an internal, axially extending keyway 38 formed in the connector shaft 32. After installation, the connector shaft is staked at 40 to block the end of the key way 38 to trap the drive shaft in the connector shaft while allowing the axial sliding or telescopic movement between these two parts.

An arched flat spring 44 located in a pocket 46 in the shaft 30 engages the inner surface of the connector shaft 32 to preload this sliding connection. A tubular torsion block 48 of rubber or suitable elastomeric material is bonded at its inner diameter to the connector shaft 32. A cylindrical, connector sleeve 50, bonded to the outer surface of the torsion block 48, extends axially therefrom into magnaformed connection with a shouldered end portion 53 of the yoke 54 of a lower universal joint 56. Yoke 54 is connected to a clamping yoke 58 by universal joint spider 60. Clamping yoke 58 is split to receive the stub shaft 62 of the rotary valve 64 of a power steering gear 66 that is located in the front compartment, generally the engine compartment, of the vehicle in which this invention is utilized. Pinch bolt 68 is tightened to secure the end of the intermediate shaft to the stub shaft 62 so that the steering shaft assembly is drivingly connected to the steering gear.

A spring and retainer assembly 70 is installed around shaft 30 and between the facing ends of the torsional damper 34 and the universal joint yoke 28. Preferably the drive shaft 30 is inserted through the center of the torrodial like spring and retainer assembly 70 and then inserted in the connector shaft 32. Afterwards, the outer telescoping limits of these two components is set by staking shaft 32 at 40. This inwardly projecting stake 40 blocks the end of keyway 38 and traps telescopic shaft 30, 32 together since the key will contact the stake to prevent disassembly.

The spring and retainer assembly 70 has identical annular end seats 72, 72' for receiving opposite end turns of a helical compression spring 74. The seats are preferably molded from nylon or other suitable material which isolates the spring from parts of the intermediate shaft and provide secure footing for the spring when it expands to its working height to preload the intermediate shaft components. Since the seats are identical, the same reference numerals will apply to both seats with the parts of seat 72' being identified by primed reference numerals. Each seat 72, 72' has concentric inner and outer walls 76, 78 and 76', 78' respectively to form therebetween an annular groove 80 or 80' to receive the associated end turn of the compression spring 74. Each of the outer walls 78, 78' of each seat has three axially extending loops 84, 86, 88 and 84', 86', 88'. Each loop is J-shaped in side view and the loops are arcuately spaced from one another along the outer wall 72, 72' as best illustrated in FIGS. 6 and 7. The spacing S' between the loops 86', 88' of seat 72' is adapted to closely accommodate the loop 84 of seat 72. The spaces formed between the loops 86, 88 of seat 72 receives the loop 84' of the seat 72' when the two seats are aligned as in FIG. 7 and brought together with the helical spring 74 interposed therebetween being compressed. After the seats are brought together as described, an elongated plastic strap 90 is threaded through the oppositely facing loops 86, 88 and 84' on one hand and 86', 88' and 84 on the other so that the compressed helical spring 74 is entrapped and held between the two seats 72 and 72' secured together by strap 90. The end or tail portions 92 of the plastic strap are subsequently sonically staked, plastic welded, or taped together at 94 to insure against accidental release of the spring and to facilitate the installation of the steering column in the vehicle and facilitate installation of the spring in operating position in the intermediate shaft.

With the spring entrapped by the seats and strap, spring handling is facilitated since spring entanglement problems are substantially eliminated. Thus, after being coiled and entrapped at a spring winding site, the springs can be packaged and shipped to an assembly point ready for use by the steering column installer with optimized efficiency since they can be easily handled.

When the intermediate shaft assembly 20 is initially assembled, the assembler will insert the drive shaft 30 of yoke 28 through the central opening of the spring and retainer assembly 70 and insert the drive shaft 30 within the tubular connector shaft 32 as shown best by FIG. 2. After this insertion, stake 40 is made. The intermediate steering shaft assembly is then shipped to the vehicle assembly location and secured to the lower end of the steering shaft 14. The steering column with the intermediate shaft assembly attached is installed in the operator compartment of the vehicle with the intermediate steering shaft assembly being installed through cylindrical seal assembly 96 of a suitable elastomeric material which extends through and which is attached by flange 98 to the front bulk head 100 that separates the operator compartment O of the vehicle from the front compartment F of the vehicle in which the steering gear assembly 66 is operatively mounted. The tail portions 92 of strap 90 of the spring and retainer assembly 70 extend along the interior of seal assembly 96 and exit from the outer end thereof in the operator compartment, as shown best in FIG. 1. After the intermediate shaft of the steering column has been inserted through the seal assembly 96, an installer can then adjust the lower portions of the intermediate shaft including the manual telescopic collapse of the connector shaft 32 on drive shaft 30 until the clamping yoke 58 is aligned with the stub shaft 62. At this time, the preload spring and retainer assembly 70 is in its packaged form shown in FIG. 2 and no preload force is exerted on the telescopic parts of the intermediate shaft. The intermediate shaft is then manually telescoped outwardly so that the clamping yoke 58 engages the stub shaft 62 and pinch bolt 68 is tightened to secure these components together.

After this assembly has been accomplished, the assembler will then grasp and separate the connected ends 92 of strap 90 by cutting strap just below weld 94 and pull the free strap through the J-shaped retainers on the spring seats. With the spring seats 72, 72' released from constraint, the helical spring expands and the seats will be respectively moved by the compressed spring into engagement with the yoke 28 and the end of the torsion damper 50. The spring then in its FIG. 3 position axially preloads the telescoping part of the intermediate shaft to take up looseness and to prevent rattle and other noise. The spring when seated on the spring seats, is effectively isolated from the intermediate shaft components so that noise transmission is reduced. Also, the seats provide optimized footing for the spring so that axial force is evenly exerted to move the intermediate shaft parts toward their expanded position.

While preferred embodiments and methods of this invention have been shown and described, other modifications and methods of this invention will become apparent to those skilled in the art. Accordingly, the scope of this invention is set forth in the following claims.

The embodiments of the invention in which an exclusive property or privilege is claimed are defined as follows:

1. A compression spring and spring retainer assembly comprising in combination a helical spring, first and second spring seats operatively mounted on opposite ends of said helical spring, loop means extending inwardly from said seats into adjoining position with respect to another when said seats are displaced adjacent to each other and said spring is compressively loaded therebetween, strap means extending through said loop means when said loop means are aligned, said strap having extending end portions providing pull means for releasing said strap means from said loop means to allow said helical spring to expand to a working height and relatively move said seat means in opposite directions to a predetermined extended position.

2. A compression spring and spring retainer assembly comprising in combination a helical spring, first and second spring seat means operatively mounted on opposite ends of said helical spring, loop means projecting axially inwardly from said seat means on the outside of said spring for alignment with one another when said seat means are positioned in a face-to-face relationship and said spring is compressed therebetween, elongated strap means extending through said loop means for interconnecting said seat means when said loop means are aligned, said strap having extending end portions providing manual pull means for releasing said strap means from said loop means to allow said helical spring to expand to a working height and relatively move said seat means in opposite directions to a predetermined extended position.

3. In a steering system for a wheeled vehicle, first and second steering shaft components secured in said vehicle at a fixed distance from one another, a steering shaft assembly operatively interconnecting said first and second steering shaft components for transmitting steering torque therebetween, said steering shaft assembly comprising first and second members, connector means operatively connected said first and second members for rotation together while permitting axially sliding movement with respect to one another, first attachment means for drivingly connecting said first member to said first steering shaft component, second attachment means for connecting said second member second shaft to said second steering shaft component and encapsulated spring means extensible to a working height subsequent to the attachment of said first and second members to said steering shaft components for urging said components in opposite directions to reduce lash in said steering system.

4. In a steering system for a wheeled vehicle, first and second steering shaft components secured in said vehicle at a fixed distance from one another, a steering shaft assembly operatively interconnecting said first and second steering shaft components for transmitting steering torque therebetween, said steering shaft assembly comprising first and second members, connector means operatively connected said first and second members for rotation together while permitting axially sliding movement with respect to one another, first attachment means for drivingly connecting said first member to said first steering shaft component, second attachment means for connecting said second member second shaft to said second steering shaft component and an encapsulated helical spring and seat assembly extensible to a working height subsequent to the attachment of said first and second members to said steering shaft components whereby said spring acting through the seats of said assembly urging said components in opposite directions to reduce lash in said steering system.

5. A method of operatively mounting a steering column in a vehicle and into attachment with a steering gear comprising the steps of placing a coil spring releasably entrapped in compression to a predetermined height and less than a working height between telescopically arranged first and second telescoping steering shaft components of said column, installing the steering column in a vehicle, attaching a portion of the steering column to fixed structure of a vehicle, moving said first and second components of said steering shaft toward a collapsed position to allow said components to be aligned with the input shaft of the steering gear, telescopically extending the components of said steering shaft to an elongated position, attaching one portion thereof to said steering gear and releasing said entrapped spring so that it extends to a working height to take up axial lash in the steering shaft.

6. A method of operatively mounting a steering column in a vehicle and into attachment with input of a steering gear comprising the steps of placing a helical spring releasably entrapped in compression through end seats and a release strap interconnecting said seats to a predetermined height and less than a working height between telescopically arranged first and second telescoping steering shaft components of said column installing the steering column in a vehicle, attaching a portion of the steering column to fixed structure of a vehicle, moving said first and second components of said steering shaft toward a collapsed position to allow said components to be aligned with the input shaft of the steering gear, telescoping the components of said steering shaft to an elongated position, attaching one portion thereof to said steering gear and pulling said release strap to releasing said spring so that it extends to a working height and acts through said seats to take up axial lash in the steering shaft.

* * * * *